United States Patent
Varga et al.

(10) Patent No.: US 7,643,322 B1
(45) Date of Patent: Jan. 5, 2010

(54) DUAL LOOP CONSTANT ON TIME REGULATOR

(75) Inventors: Craig Steven Varga, Chandler, AZ (US); Ronald Milton Crews, Mesa, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 296 days.

(21) Appl. No.: 11/740,217

(22) Filed: Apr. 25, 2007

(51) Int. Cl.
*H02M 5/42* (2006.01)

(52) U.S. Cl. .......................... 363/97; 307/66

(58) Field of Classification Search ......... 323/282–290; 363/21.04, 21.07, 21.12, 21.17; 307/64–66
See application file for complete search history.

(56) References Cited

U.S. PATENT DOCUMENTS

| | | | |
|---|---|---|---|
| 4,816,982 A * | 3/1989 | Severinsky | 363/44 |
| 4,849,683 A * | 7/1989 | Flolid | 323/284 |
| 5,479,090 A * | 12/1995 | Schultz | 323/284 |
| 5,490,055 A * | 2/1996 | Boylan et al. | 363/41 |
| 6,127,784 A | 10/2000 | Grossman et al. | |
| 6,798,152 B2 | 9/2004 | Rooke et al. | |

OTHER PUBLICATIONS

I. Oh, "A Single-Stage Power Converter for a Large Screen LCD Back-Lighting," IEEE, 2006, pp. 1058-1063.
P. Narra, et al., "An Effective LED Dimming Approach," IEEE, Industry Applications Society, 2004, pp. 1671-1676.
C. Song et al., "High-Accuracy Hysteretic Current-Mode Regulator for Powering Microprocessors," IEEE, 2006, pp. 506-509.
National Semiconductor Corporation, "LM120/LM320 Series 3-Terminal Negative Regulators," Nov. 1994, 12 pgs.
National Semiconductor Corporation, "LM3404/04HV 1.0A Constant Current Buck Regulator for Driving High Power LEDs," Dec. 2006, 24 pgs.
National Semiconductor Corporation, "LM3202 650mA Minature, Adjustable, Step-Down DC-DC Converter for RF Power Amplifiers," Nov. 2006, 16 pgs.

* cited by examiner

*Primary Examiner*—Rajnikant B Patel
(74) *Attorney, Agent, or Firm*—Darby & Darby P.C.; Matthew M. Gaffney

(57) ABSTRACT

A circuit for improving the regulation of a current or voltage output using a constant-on-time regulator. The circuit uses a dual sense loop design. One sense loop is used to adjust a reference signal or a sense signal. A second sense loop compares the adjusted reference signal to a sense signal or compares the adjusted sense signal to a reference signal. Accordingly, the use of dual sense loops may maintain more accurate output regulation while enabling an increased dynamic response to changes in output voltage or current.

20 Claims, 7 Drawing Sheets

DUAL LOOP CONSTANT ON TIME REGULATOR

TECHNICAL FIELD

The invention is generally directed to the area of the power regulation. The invention is directed, particularly, but not exclusively to an apparatus and a method for improving the regulation of the output current or voltage of a constant on time regulator.

BACKGROUND

Power regulation (either current or voltage) is commonly employed to provide stable power to electrical devices. Common regulators include both linear regulators and switching regulators. Linear regulators are often used in low noise applications and for simplicity, especially when efficiency is not important. Switching regulators are commonly employed where size and efficiency are important. For example, switching regulators are often used in applications where high load current is required. Higher efficiency results in less heat and thus simplifies heat dissipation considerations.

Regulators are commonly arranged to compare an output current or output voltage with a reference source to provide an error sense signal regarding the status of the output. This error sense signal may be proportionally related to an average output value and may also be used to control the operation of the regulator. For example, the error sense signal may be used to increase the power delivered to the load, decrease the power delivered to the load, selectively couple an input node to an output node, change switching frequency, and/or other similar acts.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
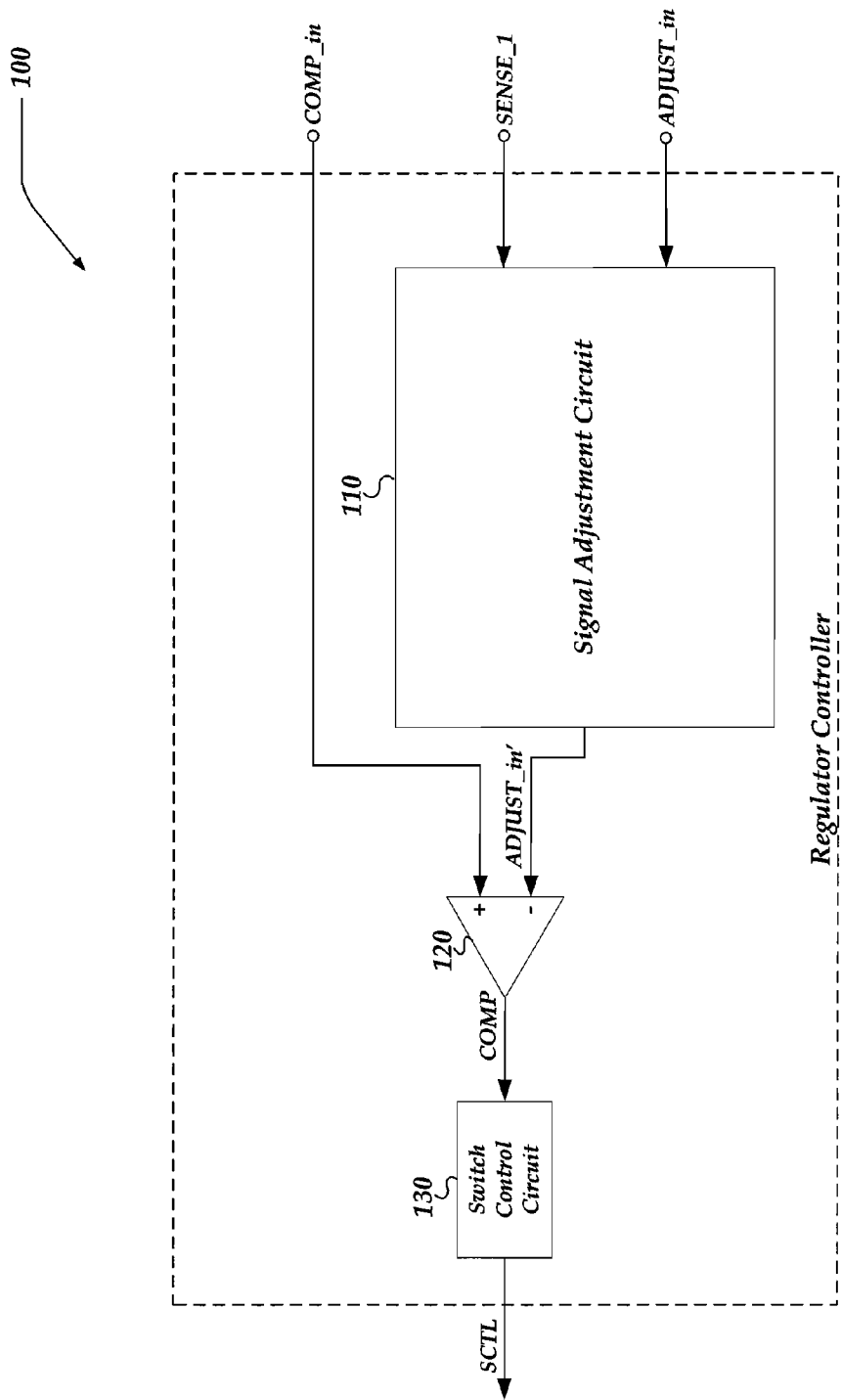
FIG. 1 is a block diagram of a regulator controller according to an embodiment of the present invention.

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, in part or in whole on," and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention is related to circuitry and a method for improving the regulation of a current or voltage output in constant-on-time regulator through the use of a dual sense loop design. One sense loop is used to adjust a reference signal or a sense signal. A second sense loop compares the adjusted reference signal or the adjusted sense signal to a sense signal or a reference signal, respectively. Accordingly, the use of dual sense loops may maintain more accurate output regulation while enabling an increased dynamic response to changes in output voltage or current.

For example, in one embodiment, one sense loop is employed to compare an output current to a reference and is used to adjust a reference signal. This loop employs error information regarding the output current and is employed to keep the output current substantially constant. In this embodiment, the second sense loop compares the adjusted reference signal to another sense signal. The second loop may also employ information regarding changes in component values due to heating, aging, drift and/or the like.

Accordingly, the use of dual sense loops may maintain more accurate output regulation while enabling an increased dynamic response to changes in output current draw. FIG. 1 is a block diagram of an embodiment of regulator controller 100. Regulator controller 100 is arranged to receive sense signal SENSE_1, source input signal ADJUST_in, and comparison input signal COMP_in; and is further arranged to provide switch control signal SCTL. Regulator controller 100 includes signal adjustment circuit 110, comparison circuit 120, and switch control circuit 130. In one embodiment, source input signal ADJUST_in is a reference signal.

In the illustrated embodiment, signal adjustment circuit 110 is arranged to provide an adjusted source signal ADJUST_in' based on the value of source input signal ADJUST_in, and the value of sense signal SENSE_1 over a duration of time. In one embodiment, the value of sense signal SENSE_1 over a duration of time is provided by a circuit with memory. In one embodiment, signal adjustment circuit 110 includes memory (not shown) and may provide the adjusted source signal ADJUST_in' based, at least in part, on the values on the source input signal ADJUST_in at both a first time and at a second time. In other embodiments, other time periods or durations of time may be used. During these time periods, sampling may be at discrete times, continuously, and/or the like. For example, a digital circuit or analog circuit may be used and may include one or more integration circuits, differentiation circuits, signal processing circuits, summing circuits, subtraction circuits, delay stages, and/or the like.

In one embodiment, comparison circuit 120 is arranged to receive comparison input signal COMP_in and adjusted source signal ADJUST_in', and to provide comparison signal COMP. In some embodiments, comparison circuit 120 includes a comparator, which is arranged to output a logical one on comparison signal COMP when comparison input signal COMP_in is greater than adjusted source signal ADJUST_in' and to output a logical zero when comparison input signal COMP_in is lower than adjusted source signal ADJUST_in'. In other embodiments, the output of comparison circuit 120 may be inverted or comparison circuit 120 may include an error amplifier, a differential amplifier, and/or the like.

In one embodiment, switch control circuit 130 arranged to receive comparison signal COMP and provide switch control signal SCTL to control the switching of the switch circuit of the regulator. In one embodiment, switch control circuit 130 includes drivers and/or level shifters which directly drive a switching circuit. In other embodiments, switch control circuit 130 includes additional logic and/or is arranged to receive additional control inputs. For example, switch control circuit 130 may include a one-shot, current limiting logic, mode controllers, and/or the like. Switch control circuit 130 may also be arranged to receive various reference voltages, load current limits, load current indicators, input current limits, input current indicators, temperature limits, temperature indicators, mode selection signals, enable signals, and/or the like.

In at least one embodiment, regulator controller 100 differs from the illustrated embodiment. For example, source input signal ADJUST_in may be internally generated by signal adjustment circuit 110 or another circuit. In another example, comparison input signal COMP_in and sense signal SENSE_1 may be the same signal and provided from or by a single source but may be processed differently. These and other embodiments are within the spirit and scope of the invention.

Figure 2:
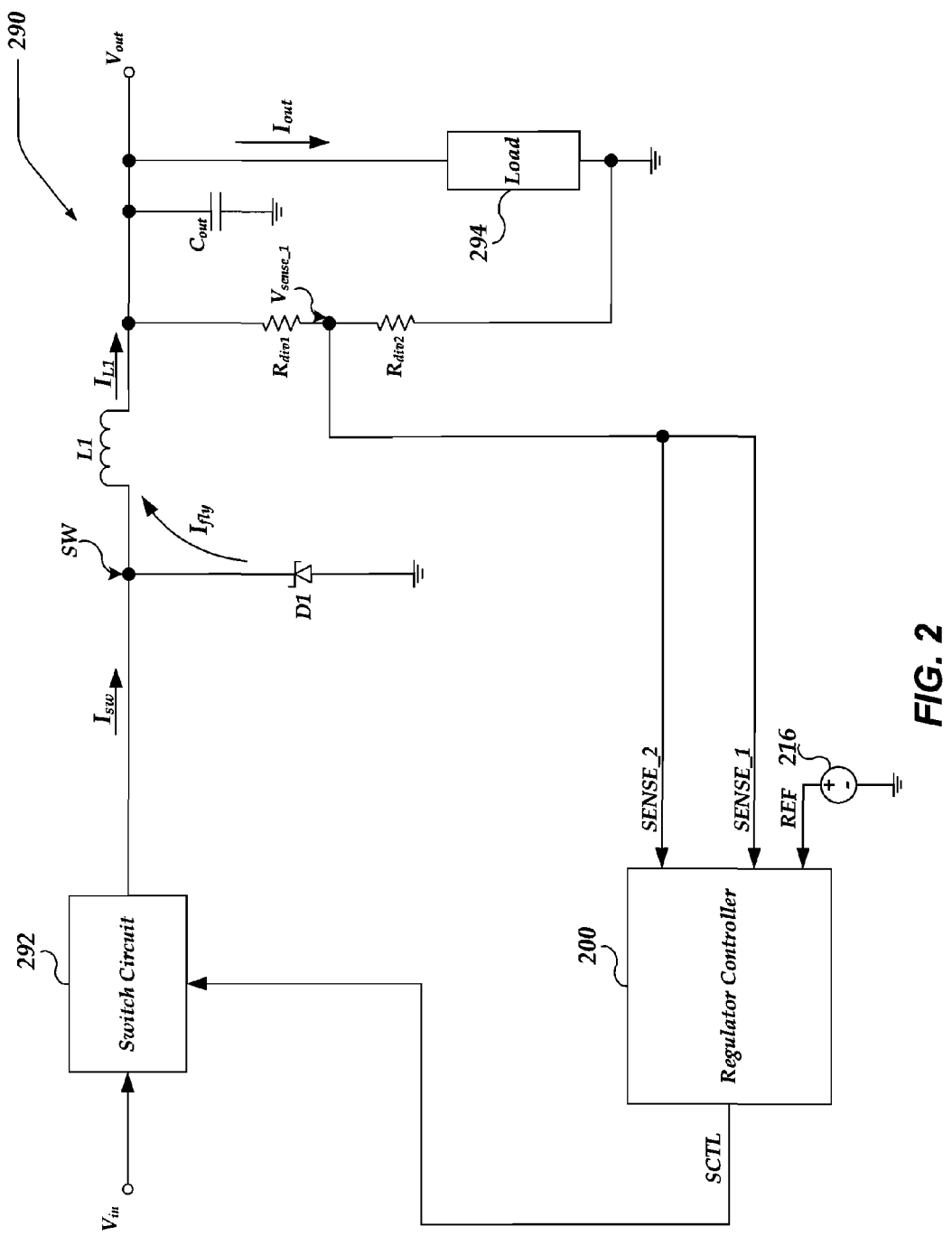
FIG. 2 is a block diagram of one embodiment of a regulator according to aspects of the present invention.

FIG. 2 is a block diagram an embodiment of regulator 290. Regulator controller 200 may be employed as an embodiment of regulator controller 100 of FIG. 1, where sense signal SENSE_2 is signal COMP_in and reference signal REF is signal ADJUST_in, respectively, of FIG. 1. Regulator 290 includes regulator controller circuit 200, reference source 216, switch circuit 292, load 294, inductor L1, diode D1, output capacitor $C_{out}$, and resistors $R_{div1}$ and $R_{div2}$.

In the illustrated embodiment, voltage regulator 290 is a simplified model of a switched mode buck voltage regulator. In other embodiments, regulator controller 200 may also be suitably used with other regulators, such as boost regulators, buck-boost regulators, inverting regulators, fly-back converters, switching regulators, linear regulators, and/or any type of regulators. Such regulators may be voltage mode regulators, current mode regulators, synchronously rectified, asynchronously rectified, and/or the like. Such regulators may also be voltage regulators, current regulators, and/or the like. These and other variations may be employed for regulator circuit 290 without departing from the spirit and scope of the invention.

In one embodiment, switch circuit 292 is arranged to selectively couple node $V_{in}$ to node SW under the control of switch control signal SCTL. In this embodiment, switch circuit 292 consists of one or more switch transistors coupled between node $V_{in}$ and node SW. In one embodiment, the switch transistor is an N-channel MOSFET device. However, P-channel MOSFET devices, BJT transistors, JFET transistors, relays, and/or other electrically controlled switching devices may also be suitably used in the same or in other embodiments.

In a basic mode of operation for an embodiment, switch circuit 292 is closed to selectively couple node $V_{in}$ to node SW under the control of regulator controller 200. While switch circuit 292 is closed, current $I_{sw}$ flows from node $V_{in}$ through switch circuit 292 into inductor L1 and also begins supplying load current $I_{out}$ to load 294. At some point, regulator controller 200 de-asserts signal SCTL to open switch circuit 292. While switch circuit 292 is open, current $I_{fly}$ flows in a loop from ground, through diode D1, and inductor L1 to load 294. The voltage at node $V_{out}$ may be monitored by sensing the voltage at node $V_{out}$ or by sensing the voltage at node $V_{sense\_1}$ Node $V_{sense\_1}$ is between voltage divider resistors $R_{div1}$ and $R_{div2}$. When the remaining energy in inductor L1 decreases, the voltages at node $V_{out}$ and at node $V_{sense\_1}$ decrease. This decreased voltage is detected by regulator controller 200 which then closes switch circuit 292 to couple node $V_{in}$ to node SW. For example, switch circuit 292 may be closed when the voltage at node $V_{sense\_1}$ increases or decreases below a threshold represented by adjusted source signal ADJUST_in' (of FIG. 1) or when the value on adjusted source signal ADJUST_in' falls or rises above the voltage at node $V_{sense\_1}$ This sequence may repeat on a periodic basis.

Inductor L1, diode D1, capacitor $C_{out}$, and resistors $R_{div1}$ and $R_{div2}$ may be of any values and types that are suitable for the requirements of a given implementation of regulator 290.

Figure 3:
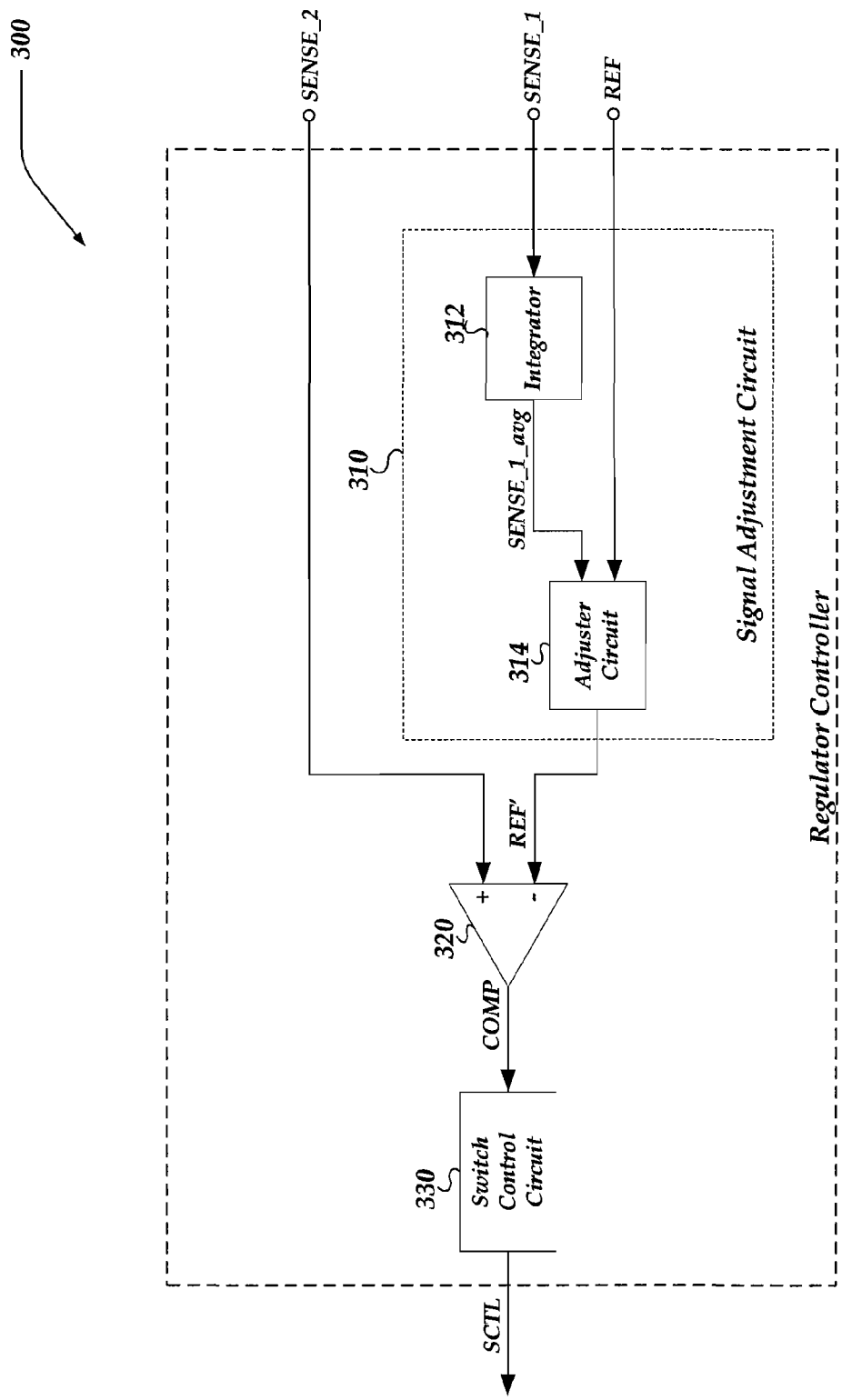
FIG. 3 is a block diagram of one embodiment of a regulator controller according to aspects of the present invention.

FIG. 3 is a block diagram of an embodiment of regulator controller 300. Regulator controller 300 may be employed as an embodiment of regulator controller 100 of FIG. 1. Regulator controller 300 includes signal adjustment circuit 310, comparison circuit 320, and switch control circuit 330. Regulator controller 300 is arranged to receive sense signal SENSE_2, sense signal SENSE_1, and reference signal REF; and is further arranged to provide switch control signal SCTL.

Sense signal SENSE_1 and sense signal SENSE_2 are received and each represent a magnitude of a load current, input current, output voltage, input voltage, output power, input power, and/or the like. Signals SENSE_1 and SENSE_2 may each be provided by a current sense circuit, a power sense circuit, a voltage divider circuit, DCR sensing, may be directly measured from a node, and/or the like. In certain embodiments, sense signal SENSE_1 and sense signal SENSE_2 each represent a current that is associated with an inductor of a regulator. In at least one embodiment, sense signal SENSE_2 represents a current that is provided to a load (e.g., current $I_{out}$) and sense signal SENSE_1 represents a flywheel current (e.g., current $I_{fly}$) through a diode or synchronous switch of a regulator. In at least one embodiment, sense signals SENSE_1 and SENSE_2 are the same signal.

In the illustrated embodiment, signal adjustment circuit 310 includes integrator 312 and adjuster circuit 314 and is arranged to provide adjusted reference signal REF' based on the value of reference signal REF and the value of sense signal SENSE_1 over a duration of time.

In one embodiment, integrator 312 is arranged to receive sense signal SENSE_1 and to provide average value signal SENSE_1_avg. Average value signal SENSE_1_avg may be proportional to or otherwise representative of the average value of signal SENSE_1 over a period of time. For example, integrator 312 may be arranged to ascertain the average value of SENSE_1 during a single switching period. However, integrator 312 may also be arranged to integrate over predefined time period, a dynamically determined time period, continuously, over multiple switching cycles, and/or the like. In yet other embodiments, other circuits may be suitably employed to provide average value signal SENSE_1_avg using memory of the value on sense signal SENSE_1 values over a duration of time. These and other embodiments are within the spirit and scope of the invention.

In one embodiment, adjuster circuit 314 is arranged to receive average value signal SENSE_1_avg from integrator 312 and reference signal REF; and is further arranged to provide adjusted reference signal REF'. Reference signal REF may be provided directly or indirectly by either an internal or external reference source and may represent a current, voltage, power, and/or the like. In the embodiment shown in FIG. 3, reference signal REF is externally provided.

In one embodiment, adjuster circuit 314 is arranged to provide adjusted reference signal REF' by amplifying the difference between average value signal SENSE_1_avg and reference signal REF. For example, regulator controller 300 and an associated regulator may be arranged such that adjusted reference signal REF' represents a comparison threshold which is dynamically compensated such that an average value associated with the output of a regulator can be more accurately regulated.

Certain regulation topologies and techniques, such as those which base regulation on references values that are not directly related to an average regulator output, may also benefit. Certain regulators, such as constant-on-time regulators, and/or the like, are configured to detect sense signals at thresholds which do not directly relate to the average regulator output. For example, a valley sensing constant-on-time regulator may be configured to initiate a one-shot pulse when a sense signal falls to below a reference value, and/or the like. Aspects of certain embodiments of the invention may be used regulate the average output of other regulators.

In other embodiment, other techniques may be suitably employed to provide signal REF' from signal REF. For example, various embodiments of adjuster circuit 314 may be arranged to subtract a portion of the difference between reference signal REF and average value signal SENSE_1_avg from reference signal REF, add reference signal REF to average value signal SENSE_1_avg, and/or the like.

In the illustrated embodiment, comparison circuit 320 is arranged to compare sense signal SENSE_2 and adjusted reference signal REF' to provide comparison signal COMP. Also, in the illustrated embodiment, switch control circuit 330 is arranged to receive input signal COMP and to provide switch control signal SCTL for controlling the switching of a regulator switching circuit.

Figure 4:
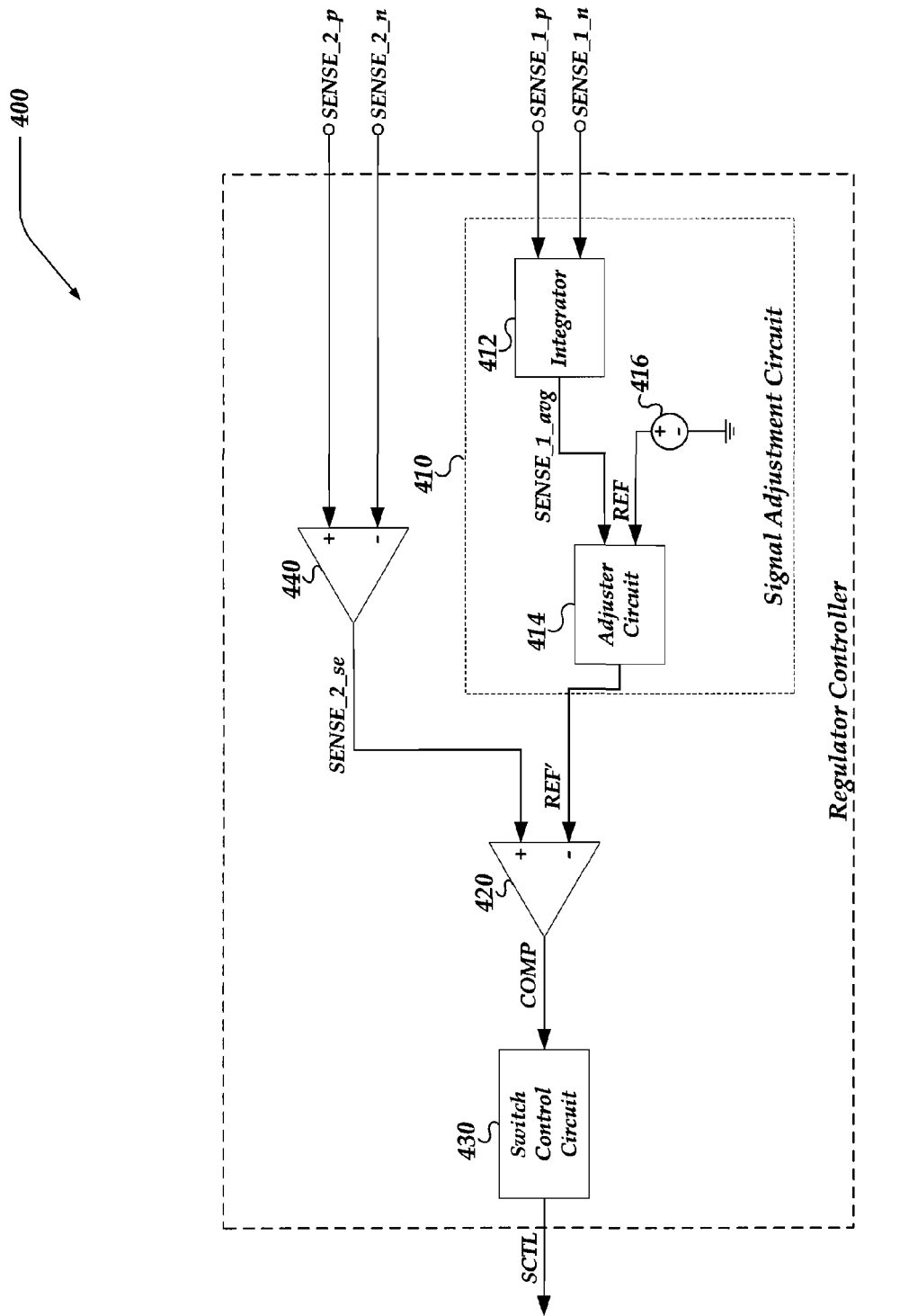
FIG. 4 is a block diagram of one embodiment of a current regulator controller according to aspects of the present invention.

FIG. 4 is a block diagram of an embodiment of current regulator controller 400. Current regulator controller 400 may be employed as an embodiment of regulator controller 100 of FIG. 1. Regulator controller 400 includes signal adjustment circuit 410, comparison circuit 420, switch control circuit 430, and sense conversion circuit 440. Regulator controller 400 is arranged to receive differential input sense signal pairs SENSE_1_p and SENSE_1_n, and SENSE_2_p and SENSE_2_n; and is further arranged to provide single-ended switch control signal SCTL.

In the embodiment shown in FIG. 4, differential sense signals SENSE_1_p and SENSE_1_n each represent a voltage at different nodes of a sense resistor having an expected resistance value. By determining the voltage across the sense resistor, the current through the sense resistor can be ascertained. Also, a value of a sense current can be similarly ascertained from differential sense signals SENSE_2_p and SENSE_2_n. In other embodiment, these and other currents may be measured using other circuitry or techniques. For example, a current controlled current source, current controlled voltage source, current sense transformer, current sense relay, current sense amplifier, magnetic flux sensors, and/or the like, and combinations thereof, may be suitably employed. These and other circuits and techniques may be employed to provide either a differential or single-ended sense signal. These and other variations are within the spirit and scope of the invention.

In the illustrated embodiment, signal adjustment circuit 410 includes integrator 412, adjuster circuit 414, and reference source 416; and is arranged to provide adjusted reference signal REF' based on the value of reference signal REF and the value of sense signals SENSE_1_p and SENSE_1_n over a duration of time.

In one embodiment, integrator 412 is arranged to receive differential sense signals SENSE_1_p and SENSE_1_n and to provide single-ended average value signal SENSE_1_avg to indicate the value of the sensed current over a duration of time.

In one embodiment, adjuster circuit 414 is arranged to receive average value signal SENSE_1_avg from integrator 412 and reference signal REF; and is arranged to provide adjusted reference signal REF'. As shown, reference signal REF is provided by internal reference source 416. In one embodiment, adjuster circuit 414 is arranged to provide adjusted reference signal REF' by adjusting reference signal REF based on the value of average value signal SENSE_1_avg.

In the embodiment illustrated, sense conversion circuit 440 is arranged to receive differential sense signals SENSE_2_p and SENSE_2_n and to provide single-ended sense signal SENSE_2_se. In one embodiment, sense conversion circuit 440 includes a differential signal receiver. However, any suitable circuit, such as those discussed above, may be employed to convert differential signals to single-ended signals.

In the illustrated embodiment, comparison circuit 420 is arranged to compare single-ended sense signal SENSE_2_se and adjusted reference signal REF' to provide comparison signal COMP. In this embodiment, comparison circuit comprises a comparator that can output one of two logic states.

In one embodiment, switch control circuit 430 is arranged to receive input signal COMP and provide switch control signal SCTL for controlling the switching of the regulator switching circuit, pass circuit, and/or the like. Any logic or control circuit, such as those discussed above may be suitably employed.

Figure 5:
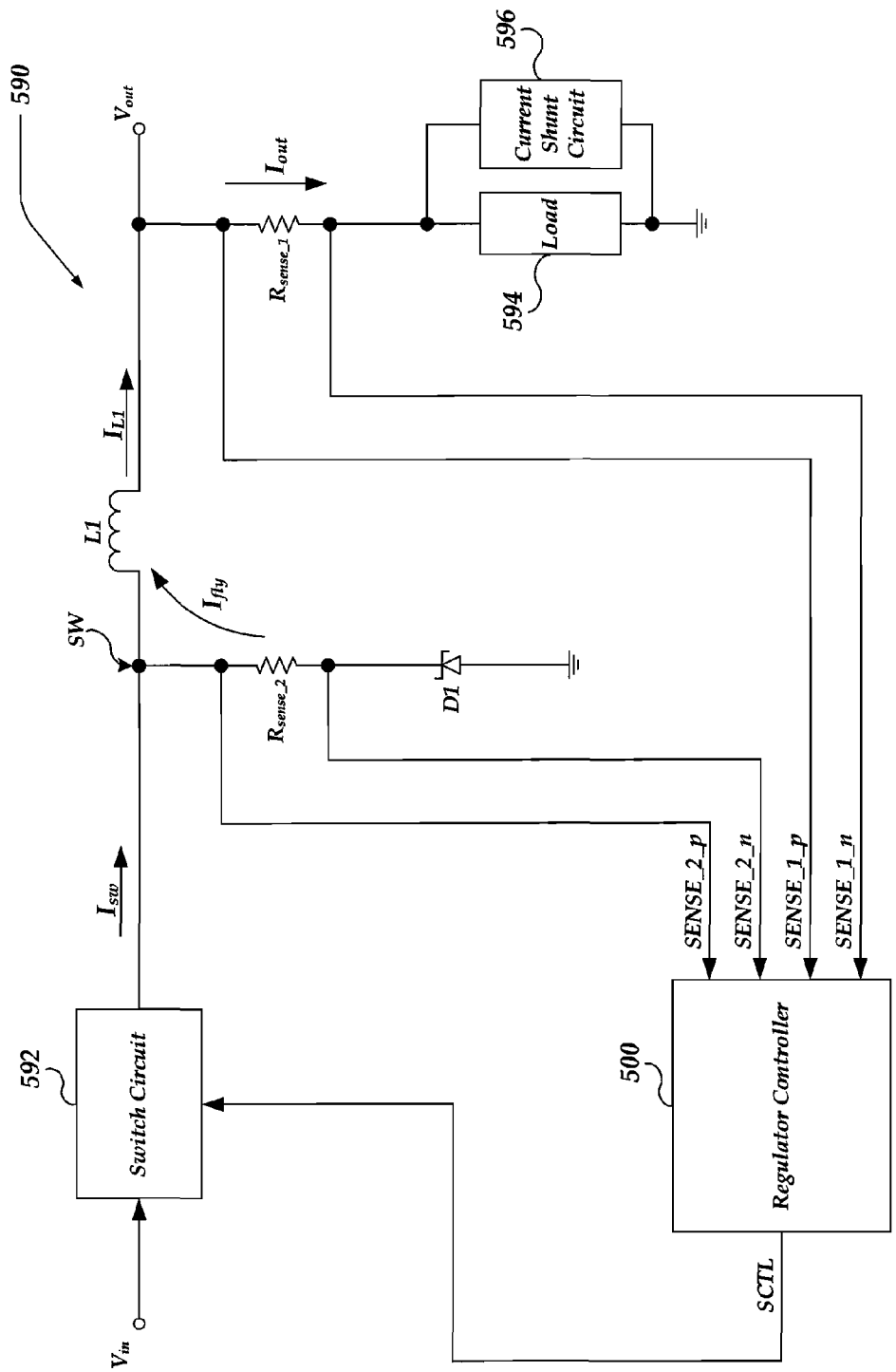
FIG. 5 is a schematic diagram of a current regulator controller according to an embodiment of the present invention.

FIG. 5 is a block diagram an embodiment of regulator 590. Regulator 590 includes regulator controller circuit 500, switch circuit 592, load 594, inductor L1, diode D1, and resistors $R_{sense\_1}$ and $R_{sense\_2}$. Also, in certain embodiments, regulator 590 includes current shunt circuit 596. regulator controller 500 may be employed as an embodiment of regulator controller 100 of FIG. 1. In one embodiment, regulator controller 500 is employed as an embodiment of regulator controller 400 of FIG. 4.

In the illustrated embodiment, current regulator 590 is a simplified model of a switched mode buck current regulator. In other embodiments, regulator controller 500 may also be suitably employed with other regulators, such as those discussed above.

In one embodiment, resistors $R_{sense\_1}$ and $R_{sense\_2}$ are arranged such that the voltages across resistors $R_{sense\_1}$ and $R_{sense\_2}$ are substantially proportional to the load current $I_{out}$ and flywheel current $I_{fly}$ respectfully.

Inductor L1, diode D1, and resistors $R_{sense\_1}$ and $R_{sense\_2}$ may be of any values and types that are suitable for the requirements of a given implementation of regulator 590. In certain embodiments, regulator 590 is a synchronous regulator wherein diode D1 is omitted and a synchronous switch is arranged to selectively couple inductor L1 to ground via resistor $R_{sense\_2}$.

In at least one embodiment, regulator 590 includes current shunt circuit 596 which is arranged to shunt current away from load 594. For example, current shunt circuit 596 may be employed to change the average current provided to load 594 without having to account for loop delay and other loop and/or feedback considerations. In addition, shunting current away from load 594 enables regulator 590 to provide a substantially constant current through inductor L1 and may enable slower dynamic adjustment circuitry to accomplish the desired regulation.

In this embodiment, shunt circuit 596 consists of one or more switch transistors coupled in parallel to load 594. In one embodiment, a switch transistor is a P-channel MOSFET device. However, N-channel MOSFET devices, BJT transistors, JFET transistors, relays, and/or other electrically controlled switching devices may also be suitably used in the same or other embodiments.

Shunt circuit 596 may be controlled by any suitable circuit, method, or techniques. In one embodiment, shunt circuit 596 may be a low impedance switch that is controlled by a clock signal, pulse-width-modulated signal, and/or the like, to selectively shunt substantially all current away from load 594 without causing first order changes to inductor current $I_{L1}$. Accordingly, the flow of current through inductor L1 is substantially constant. In other embodiments, shunt circuit 596 is a variable impedance shunt circuit that is arranged to selectively shunt some or all of current $I_{L1}$ provided by inductor L1. These and other embodiments are within the spirit and scope of the invention.

Figure 6:
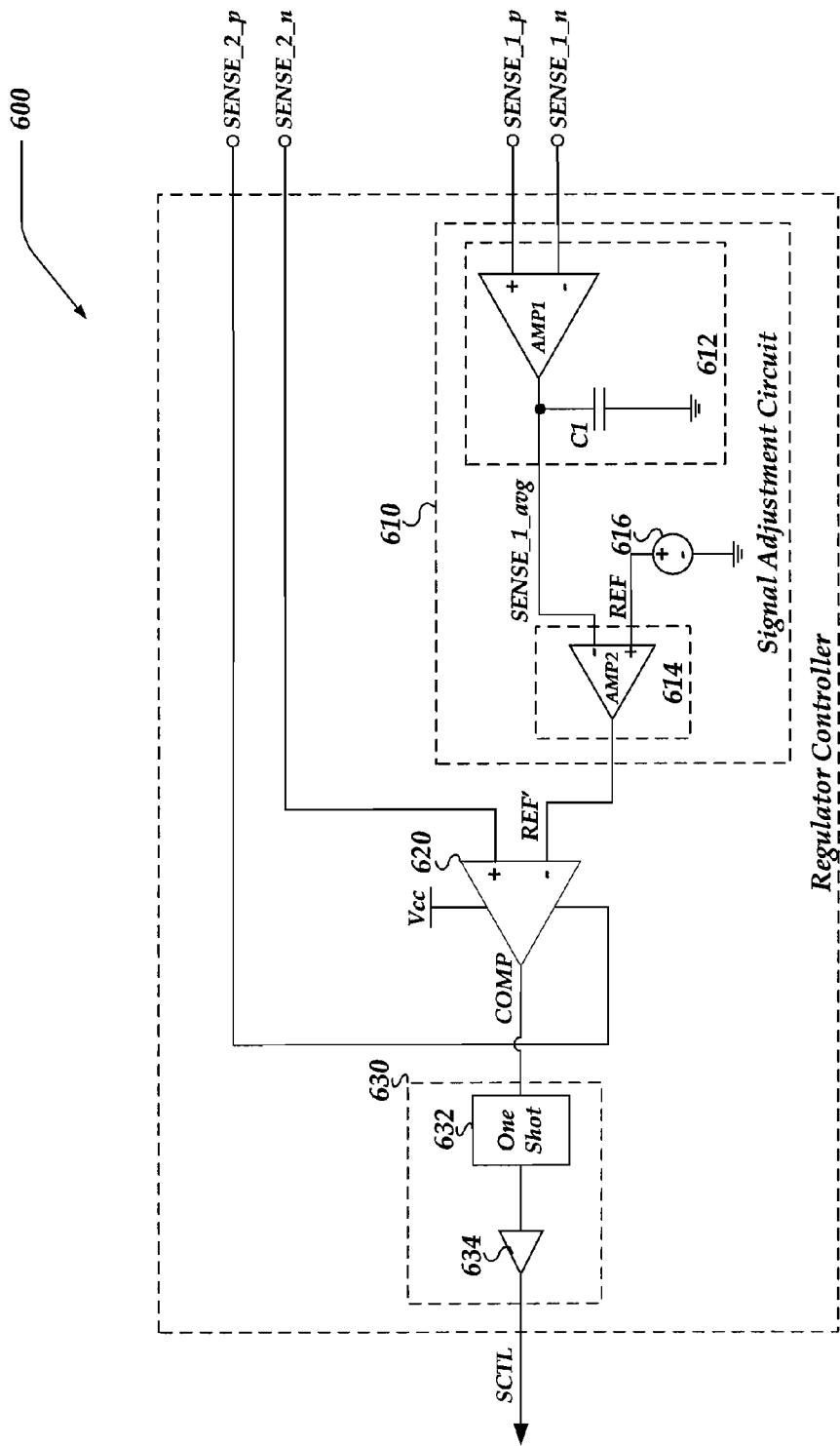
FIG. 6 is a block diagram of one embodiment of a current regulator according to aspects of the present invention.

FIG. 6 is a schematic diagram of an embodiment of current regulator controller 600. Current regulator controller 600 may be employed as an embodiment of regulator controller 100 of FIG. 1. Regulator controller 600 is arranged to receive differential sense signals SENSE_1_$p$ and SENSE_1_$n$, and differential sense signals SENSE_2_$p$ and SENSE_2_$n$; and is also arranged to provide switch control signal SCTL. Regulator controller 600 includes signal adjustment circuit 610, comparison circuit 620, and switch control circuit 630.

In the illustrated embodiment, signal adjustment circuit 610 includes integrator 612, adjuster circuit 614, and reference source 616; and is arranged to provide adjusted reference signal REF' based on the value of reference signal REF and the value of input sense signals SENSE_1_$p$ and SENSE_1_$n$ over a duration of time.

In one embodiment, integrator 612 includes amplifier AMP1 and capacitor C1. In this embodiment, amplifier AMP1 is arranged to source or sink a current which is proportionate to the difference between input sense signals SENSE_1_$p$ and SENSE_1_$n$. Also, capacitor C1 is arranged as an energy storage element such that voltage on average value signal SENSE_1_avg at a given time is related to the past difference between sense signals SENSE_1_$p$ and SENSE_1_$n$. Integration of this difference can also reduce the effect of transients, switching noise, and other noise or interference.

In the embodiment of FIG. 6, adjuster circuit 614 includes error amplifier AMP2 that that is arranged to provide adjusted reference signal REF' based, at least in part, on the difference between average value signal SENSE_1_avg and reference signal REF. For example, in one embodiment, error amplifier AMP2 may generate adjusted reference signal REF' by amplifying the difference between average value signal SENSE_1_avg and reference signal REF. In certain embodiments, a high gain error amplifier is employed as adjuster circuit 614.

In this way, for example, input sense signals SENSE_2_$p$ and SENSE_2_$n$ are employed as part of a primary sense loop to regulate an output current. Further, input sense signals SENSE_1_$p$ and SENSE_1_$n$ and signal adjustment circuit 610 may be part of a secondary sense loop. In this example, the primary sense loop provides a faster response to changes in output current than provided by the secondary sense loop. Likewise, the secondary sense loop is arranged to provide the value of adjusted reference signal REF' such that the average value signal SENSE_1_avg is regulated to be substantially equal to reference signal REF. In certain embodiments, this functions to regulate the average output current to a value represented by reference signal REF.

As shown in FIG. 6, reference source 616 is a fixed internal voltage source. In other embodiments, reference source 616 is adjusted by other circuitry. For example, reference source 616 may be divided by a potentiometer, divided by voltage divider resistors, generated by a digital to analog converter, generated by an op-amp circuit, and/or the like (not shown). In one embodiment, adjustment of reference source 616 enables a regulator output to be adjusted. This adjustment may be adjusted during manufacture, by a user, by a microprocessor, by a sense loop, a feedback loop, and/or the like. In one embodiment, reference source 616 is based, at least in part, on a bandgap reference.

In various other embodiments, adjusted reference signal REF' may be provided by a sample and hold circuit, digital to analog converter, analog to digital converter, summing amplifier, summing circuit, difference amplifier, difference circuit, instrumentation amplifier, and/or the like.

Comparison circuit 620 is arranged to compare differential sense signals SENSE_2_$p$ and SENSE_2_$n$ with adjusted reference signal REF' to provide comparison signal COMP. In one embodiment, signal COMP transitions when the value of adjusted reference signal REF' is equal to signal SENSE_2_$n$. In this embodiment, sense signal SENSE_2_$p$ is connected to ground.

Switch control circuit 630 of FIG. 6 includes one shot circuit 632 and driver 634. In one embodiment, one shot circuit 632 is arranged such that it provides a configured duration output pulse when comparison signal COMP transitions. For example, one shot circuit 632 may be configured to provide an output pulse either following any edge, a rising edge, falling edge, and/or the like on comparison signal COMP. The duration of the output pulse may be determined by any suitable means. In at least one embodiment, the duration of the output pulse is inversely proportional to the magnitude of an input voltage. In other embodiments, it is determined by the value of a configuration resistor, a potentiometer setting, a digital to analog converter output, a timer output, a clock signal, a register setting, and/or the like (not shown). Driver 634 may be any driver type that is suitable to drive the control input of a switch circuit of the regulator.

In one embodiment, the use of adjusted reference signal REF' by comparison circuit 620 allows regulator controller 600 to regulate the average output of a regulator and to compensate for errors normally associated with the use of valley sensing sense loops that are used to control some one-shot based regulator controllers. In another embodiments, adjusted reference signal REF' may also be employed to adjust thresholds, and/or the like, in these and other regulators and/or regulator controllers.

Figure 7:
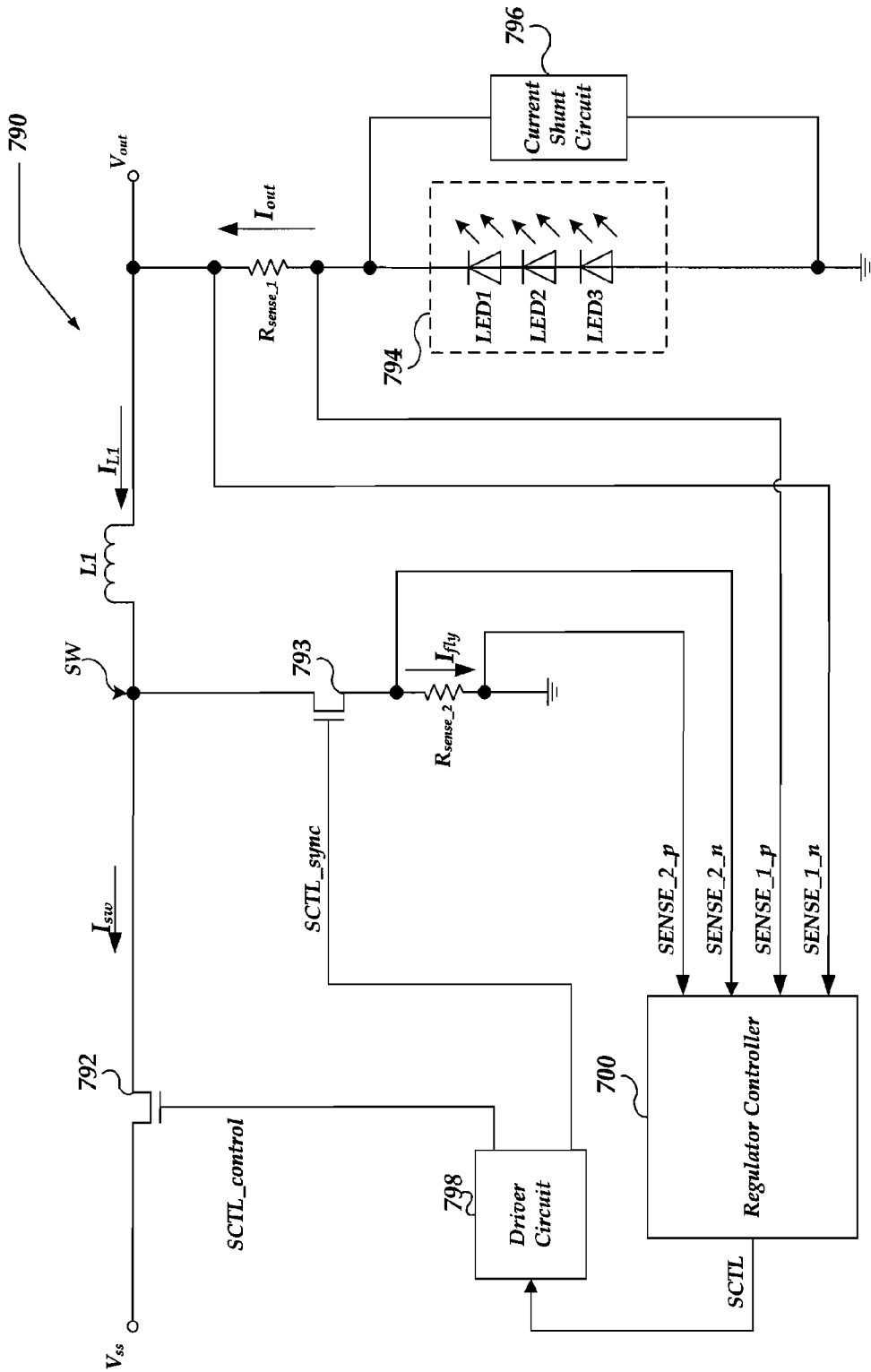
FIG. 7 is a block diagram of another embodiment of a current regulator according to aspects of the present invention.

FIG. 7 is a schematic an embodiment of current regulator 790. Current regulator 790 includes current regulator controller circuit 700, switch circuit 792, synchronous transistor 793, load 794, inductor L1, resistors $R_{sense\_1}$ and $R_{sense\_2}$, current shunt circuit 796, and driver circuit 798. In one embodiment, current regulator controller 600 of FIG. 6 is employed as current regulator controller 700.

In the embodiment of FIG. 7, regulator 790 is connected to negative supply voltage $V_{ss}$, and is arranged to sink current from a load 794, such as serially connected light emitting diode (LED) circuit arranged to provide illumination. This load 794 may be coupled in series, in parallel, or in a combination of series and parallel arrangements. Load 794 may also include an electroluminescent display, incandescent light, motor, and/or the like. In the embodiment shown, load 794 is arranged to be driven from negative supply voltage $V_{ss}$. However, regulator 790 may be supplied by any power source and may have its positive and negative inputs coupled to any voltage potential. In other embodiments, regulator 790 is coupled between a positive supply voltage and ground. In yet other embodiments, regulator 790 is coupled between two non-ground voltage supplies. Suitable modifications may be made within the spirit and scope of the invention to regulator controller 700, regulator 790, and other circuitry, to implement these and other variations.

In a basic mode of operation for an embodiment, switch circuit 792 is closed to selectively couple node $V_{in}$ to node SW under the control of current regulator controller 700 and driver circuit 798. While switch circuit 792 is closed, current $I_{sw}$ flows to node $V_{ss}$ from load 794 or shunt circuit 796 through resistor $R_{sense\_1}$, inductor L1, and switch circuit 792. During all, or substantially all, of this time, synchronous transistor 793 is open. At some point, current regulator controller 700 de-asserts signal SCTL, and driver circuit 798 de-asserts signal SCTL_control to open switch circuit 792. For all, or substantially all, of the time that switch control circuit 792 is open, signal SCTL_sync is asserted to close synchronous transistor 793 and to enable current flow from load 794 or shunt circuit 796 through resistor $R_{sense\_1}$, inductor L1, and synchronous transistor 793, and resistor $R_{sense\_2}$ to ground. During this time, inductor current $I_{L1}$ and the voltage across $R_{sense\_2}$ decreases. When the value on sense signal SENSE_2_n is equal to an adjusted reference threshold, regulator controller 700 opens synchronous transistor 793 and initiates a one-shot pulse to close switch circuit 792 and open synchronous transistor 793. This sequence may repeat on a periodic basis.

Driver circuit 798 is arranged to receive switch control signal SCTL and to provide control signals SCTL_control, and SCTL_sync. In one embodiment, SCTL_control is generated by buffering signal SCTL and SCTL_sync is generated by inverting signal SCTL. In other embodiments, delay circuits, logic circuits, state machines, and/or the like, may be suitably employed. In at least one embodiment, driver circuit 798 is part of regulator controller 700.

In this embodiment, synchronous transistor 793 is a switching transistor coupled between ground and resistor $R_{sense\_2}$. In one embodiment, a switch transistor is a P-channel MOSFET device. However, P-channel MOSFET devices, BJT transistors, JFET transistors, relays, and/or other electrically controlled switching devices may also be suitably used in the same or other embodiments.

Inductor L1, and resistors $R_{sense\_1}$ and $R_{sense\_2}$ may be of any values and types that are suitable for the requirements of a given implementation of current regulator 790.

In the embodiment shown in FIG. 7, current shunt circuit 796 is arranged to shunt current away from load 794. For example, current shunt circuit 796 may be used to dim or otherwise control the intensity, color, heat, and/or the like, of LEDs LED1-LED3 without changing current $I_{L1}$ through inductor L1.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for regulating an output signal, comprising:
   a regulator controller, including:
      a signal adjustment circuit that is arranged to receive a first sense signal that is based, at least in part, on the output signal during a steady state of operation; to receive a reference signal; and to provide an adjusted signal by adjusting the reference signal, wherein the adjustment is based on a value of the first sense signal at a first time and a value of the first sense signal at a second time;
      a comparison circuit that is arranged to receive the adjusted signal and a second sense signal that is based, at least in part, on the output signal, and is further arranged to provide a comparison signal by performing a comparison between the adjusted signal and the second sense signal; and
      a control circuit, including:
         a one shot circuit that is arranged to receive the comparison signal and to provide a switch control signal, and is arranged such that if the comparison signal is asserted, the control signal is asserted for a configured duration and is de-asserted at the end of the configured duration.

2. The circuit of claim 1, wherein the one shot circuit is arranged such that the configured duration is inversely proportional to a magnitude of a voltage at an input supply node.

3. The circuit of claim 1, wherein the signal adjustment circuit is arranged such that the adjustment is based, at least in part, on integrating the values on the first sense signal.

4. The circuit of claim 1, wherein the circuit is arranged such that the first sense signal is substantially proportional to a load current and the second sense signal is substantially proportional to a flywheel current.

5. The circuit of claim 1, wherein the circuit is arranged such that the first sense signal is the second sense signal.

6. The circuit of claim 1, wherein the circuit is arranged such that an average value associated with the output signal is regulated.

7. The circuit of claim 1, further comprising:
   a shunt circuit that is arranged to shunt a load current away from a load, such that the load current remains substantially constant during a steady state of operation.

8. The circuit of claim 1, wherein the signal adjustment circuit includes:
    an integrator that is arranged to receive the first sense signal and to provide an integrated signal, and is further arranged such that the integrated signal is based, at least in part, on a value determined by integrating the value of the first sense signal from the first time to the second time; and
    an adjuster circuit that includes an error amplifier that is arranged to receive the integrated signal and the reference signal, and to provide the adjusted signal.

9. The circuit of claim 1, further comprising:
    a switch circuit that is coupled to an input supply node and coupled to a switch node, wherein the switch circuit is arranged to receive the switch control signal, and is further arranged such that if the switch control signal is asserted, the input supply node is coupled to the switch node;
    a first sense circuit that is arranged to provide the first sense signal based, at least in part, on a first current that is associated with an inductor; and
    a second sense circuit that is arranged to provide the second sense signal based, at least in part, on a second current that is associated with the inductor.

10. The circuit of claim 1, wherein the signal adjustment circuit includes:
    an integrator that is arranged to receive the first sense signal and to provide an integrated signal, and is further arranged such that the integrated signal is based, at least in part, on a value determined by integrating the value of the first sense signal from the first time to the second time; and
    an adjuster circuit that is arranged to receive the integrated signal and to provide an adjusted signal, and is further arranged such that the adjusted signal is based, at least in part, on the reference signal and the integrated signal.

11. The circuit of claim 10, wherein the adjuster circuit includes an error amplifier having at least a first input, a second input, and an output, wherein the error amplifier is arranged to receive the integrated signal as the first input, to receive the reference signal as the second input, and to provide the adjusted signal as the output.

12. The circuit of claim 10, wherein the integrator is arranged such that the integrated signal is based, at least in part, on a value determined by averaging the value of the first sense signal from the first time to the second time.

13. A method of regulating an output signal, comprising:
    regulating an output signal, including:
        receiving a reference signal, a first sense signal, and a second sense signal;
        providing an adjusted signal by adjusting the reference signal based, at least in part on, a value of the first sense signal at a first time and a value of the first sense signal at a second time;
        providing a comparison signal by performing a comparison between the adjusted signal and the sense signal;
        providing a switch control signal that is based, at least in part on, the comparison signal, wherein providing the switch control signal includes:
            employing the comparison signal to generate an output pulse such that if the comparison signal is asserted, the switch control signal is asserted for a configured duration and is de-asserted at the end of the configured duration; and
        employing a switch circuit and the switch control signal to regulate the output signal.

14. The method of claim 13, wherein the configured duration is inversely proportional to a magnitude of a voltage at an input supply node.

15. The method of claim 13, wherein providing the adjusted signal includes:
    integrating the value of the first sense signal from the first time to the second time.

16. The method of claim 13, wherein providing the adjusted signal includes:
    averaging the value of the first sense signal from the first time to the second time.

17. The method of claim 13, further comprising: shunting a current away from a load, such that a current associated with the output signal remains substantially constant during a steady state of operation.

18. The method of claim 13, wherein first sense signal is substantially proportional to a load current, and wherein the second sense signal is substantially proportional to a flywheel current.

19. The method of claim 13, wherein
    providing the adjusted signal includes:
        providing an averaged signal by averaging the value of the first sense signal from the first time to the second time;
        providing the adjusted signal based, at least in part on, the difference between the value of the averaged signal and the value of the reference signal; and
    wherein providing a comparison signal further includes:
        employing a comparator to compare the second sense signal to the adjusted signal.

20. A circuit for regulating an output signal, comprising:
    a regulator controller, including:
        a signal adjustment circuit that is arranged to receive a first sense signal that is based, at least in part, on the output signal during a steady state of operation to receive a second sense signal that is based, at least in part, on the output signal; and to provide an adjusted signal by adjusting the second sense signal, wherein the adjustment is based on a value of the first sense signal at a first time and a value of the first sense signal at a second time;
        a comparison circuit that is arranged to receive the adjusted signal and a reference signal, and is further arranged to provide a comparison signal by performing a comparison between the adjusted signal and the reference signal; and
        a control circuit, including:
            a one shot circuit that is arranged to receive a comparison circuit and to provide a control signal, and is arranged such that if the comparison signal is asserted, the control signal is asserted for a configured duration and is de-asserted at the end of the configured duration.

* * * * *

UNITED STATES PATENT AND TRADEMARK OFFICE
CERTIFICATE OF CORRECTION

PATENT NO. : 7,643,322 B1 Page 1 of 1
APPLICATION NO. : 11/740217
DATED : January 5, 2010
INVENTOR(S) : Craig Steven Varga et al.

It is certified that error appears in the above-identified patent and that said Letters Patent is hereby corrected as shown below:

In column 4, line 39, after "$V_{sense\_1}$" insert -- . --.

In column 11, line 52, in claim 13, delete "part on," and insert -- part, on --, therefor.

In column 11, line 58, in claim 13, delete "part on," and insert -- part, on --, therefor.

In column 12, line 31, in claim 19, delete "part on," and insert -- part, on --, therefor.

Signed and Sealed this

Thirteenth Day of April, 2010

David J. Kappos
*Director of the United States Patent and Trademark Office*